(12) United States Patent  (10) Patent No.: US 6,599,001 B2
Johnson  (45) Date of Patent: Jul. 29, 2003

(54) FUNERAL PROCESSION WARNING APPARATUS

(76) Inventor: James E. Johnson, 4415 Bridgeman Ter., Swartz Creek, MI (US) 48473

( * ) Notice: Subject to any disclaimer, the term of this patent is extended or adjusted under 35 U.S.C. 154(b) by 8 days.

(21) Appl. No.: 09/862,960

(22) Filed: May 22, 2001

(65) Prior Publication Data

US 2002/0177356 A1 Nov. 28, 2002

(51) Int. Cl.⁷ .............................................. F21V 33/00
(52) U.S. Cl. ...................................... 362/493; 439/929
(58) Field of Search ................................ 362/121, 252, 362/370, 493, 398; 320/5; 439/500, 929; 116/173, 28 R

(56) References Cited

U.S. PATENT DOCUMENTS

| 3,148,856 A | * | 9/1964 | Orlando ...................... 116/173 |
| 3,506,956 A | * | 4/1970 | Kolm .......................... 362/496 |
| 3,955,786 A | | 5/1976 | Duddy |
| 4,052,697 A | | 10/1977 | Daifotes |
| 4,110,818 A | * | 8/1978 | Hempsey ..................... 362/493 |
| 4,274,127 A | | 6/1981 | Beck et al. |
| 4,633,215 A | * | 12/1986 | Anders et al. .............. 116/173 |
| 4,866,580 A | * | 9/1989 | Blackerby .................. 362/205 |
| 4,870,543 A | * | 9/1989 | Born et al. ................. 362/542 |
| D318,132 S | | 7/1991 | Solow |
| 5,089,803 A | | 2/1992 | Bohn |
| 5,278,735 A | | 1/1994 | Her |
| 5,483,916 A | | 1/1996 | Kolvites et al. |
| 5,754,124 A | * | 5/1998 | Daggett ......................... 320/5 |
| D397,364 S | | 8/1998 | Barrett |
| D410,208 S | | 5/1999 | Fowler |
| 6,082,880 A | * | 7/2000 | Nerlino ...................... 362/493 |

* cited by examiner

Primary Examiner—Neil Abrams
(74) Attorney, Agent, or Firm—Dale J. Ream

(57) ABSTRACT

A funeral procession warning apparatus includes a base unit having top and bottom sides and defining an interior cavity. A hollow pole extends upwardly from the top side and includes a light at its free end. A rechargeable battery is positioned within the cavity and is electrically connected to the light for delivering current thereto when a switch is properly positioned. A flag having indicia indicative of a funeral procession is coupled to the pole. A male connector is electrically connected to the battery and extends through the bottom side of the base unit. The apparatus includes a recharging unit having a socket for selectably mating with the male connector for recharging the battery when the recharging unit is connected to a power source. A receiver may be positioned in the cavity for allowing current delivery to the light source upon receiving a signal from a remote transmitter.

9 Claims, 5 Drawing Sheets

FUNERAL PROCESSION WARNING APPARATUS

BACKGROUND OF THE INVENTION

This invention relates generally to signaling devices and, more particularly, to a funeral procession warning apparatus for visually alerting motorists of a funeral procession.

A funeral procession is an organized, solemn, and respectful parade for the purpose of transporting the deceased and mourners from a church or funeral home to a cemetery for a final committal service. Traditionally, all of the vehicles in the procession operate in an unbroken stream and motorists that are not a part of the procession yield to the procession. However, other motorists often times are unaware of the procession and fail to yield the right-of-way or, unfortunately, become involved in a traffic accident with the procession vehicles.

Vehicles in a funeral procession traditionally utilize their headlights to signal other motorists of the procession and various other signaling devices have been proposed. Although assumably effective for their intended purposes, existing devices do not provide a definitive visual signal that immediately signifies the funeral procession. Further, existing devices do not provide a portable and rechargeable signaling device or devices that may be operated from inside a procession vehicle while in transit.

Therefore, it is desirable to have a funeral procession warning apparatus having a base unit that may be releasably mounted to the roof or hood of a procession vehicle. Further, it is desirable to have an apparatus that includes a flag that is indicative of a funeral procession as well as a strobe light for immediately attracting the attention of other motorists. Finally, it is desirable to have an apparatus in which a battery housed in the base unit is rechargeable.

SUMMARY OF THE INVENTION

A funeral procession warning apparatus according to the present invention includes at least one base unit having top and bottom sides and defining an interior cavity. The bottom side of the base unit includes a magnet such that the base unit may releasably adhere to a flat, metallic surface of an automobile, such as the roof or hood. A hollow pole includes a first end attached to the top side of the base unit such that the pole extends vertically above the automobile surface when the base unit is coupled thereto. A light source such as a strobe light is mounted to a second end of the pole. A rechargeable battery is mounted within the cavity of the base unit and is electrically connected to the light source. A switch is mounted on the top side of the base unit and is electrically connected to the battery for selectively delivering current therefrom to the light source.

A male connector is electrically connected to the battery and extends through the bottom side of the base unit. The apparatus includes a recharging unit for holding at least one base unit and includes a socket adapted to mate with the male connector. The recharging unit is adapted to be connected to a power source for recharging the rechargeable battery in the base unit when the male connector is connected to the socket. The recharging unit may include a plurality of receptacles with corresponding sockets for holding and recharging a plurality of base units. Alternatively, the base unit may include a receiver electrically connected to the battery and positioned intermediate the battery and light source for allowing current delivery therebetween only upon receiving a predetermined signal from a remote transmitter. This allows the signal of a single transmitter to activate the lights of a plurality of base units being used in a funeral procession.

Therefore, a general object of this invention is to provide a funeral procession warning apparatus for visually alerting other motorists of a funeral procession.

Another object of this invention is to provide a warning apparatus, as aforesaid, which magnetically adheres to a vehicle participating in a funeral procession.

Still another object of this invention is to provide a warning apparatus, as aforesaid, which includes a flag and a strobe light for immediately attracting the attention of motorists relative to the funeral procession.

Yet another object of this invention is to provide a warning apparatus, as aforesaid, which includes a rechargeable battery.

A further object of this invention is to provide a warning apparatus, as aforesaid, which shields the eyes of a driver in the funeral procession from the light rays of the strobe light.

A still further object of this invention is to provide a warning apparatus, as aforesaid, which includes a carrying case that is adapted to recharge base units stored therein.

Another object of this invention is to provide a warning apparatus, as aforesaid, in which each base unit includes a receiver for allowing current to energize the light source when a predetermined signal is received from a remote transmitter.

Other objects and advantages of this invention will become apparent from the following description taken in connection with the accompanying drawings, wherein is set forth by way of illustration and example, embodiments of this invention.

DESCRIPTION OF THE PREFERRED EMBODIMENT

Figure 2:
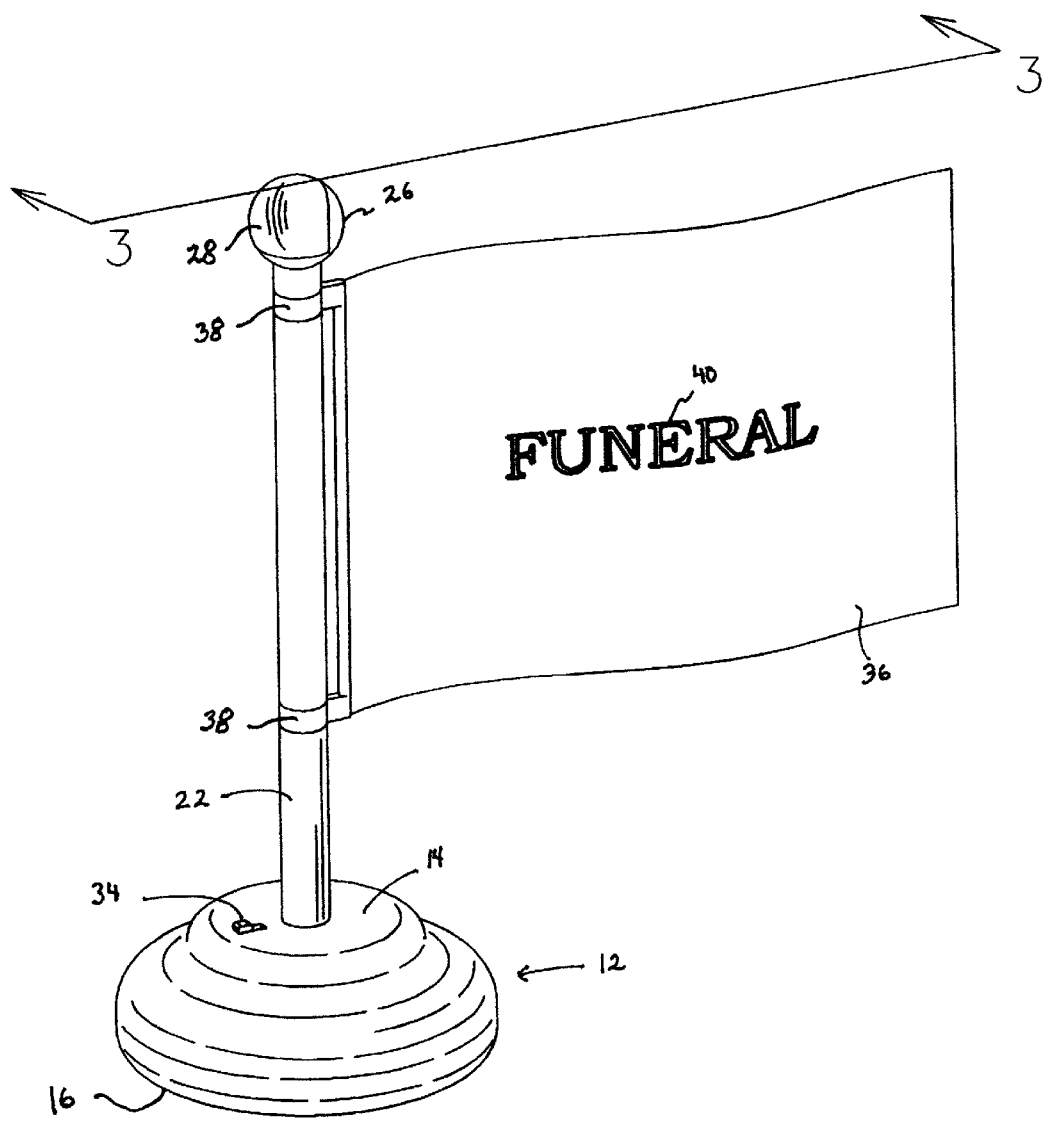
FIG. 2 is a perspective view of a base unit as in FIG. 1 removed from the recharging unit.
Figure 3:
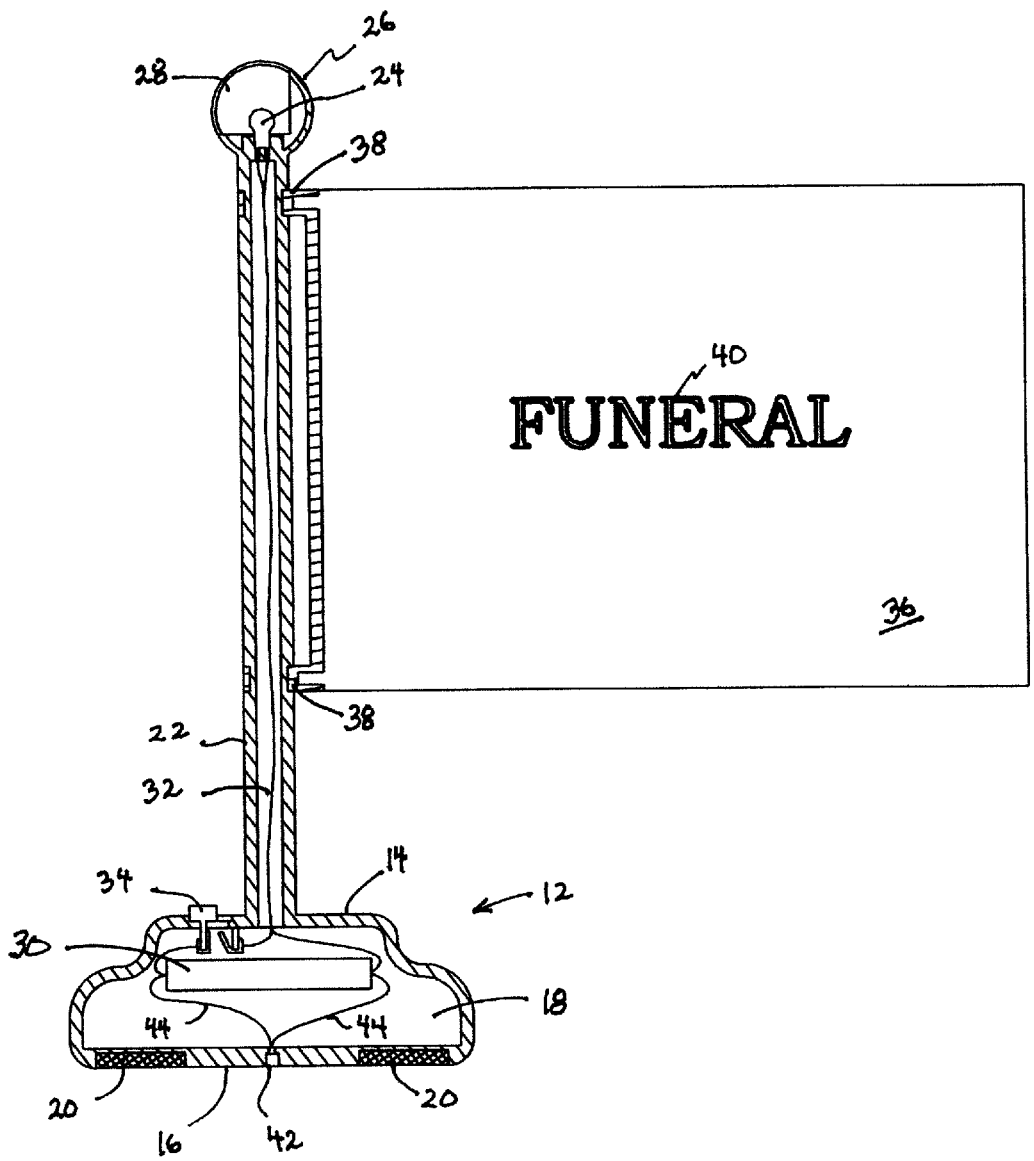
FIG. 3 is a sectional view taken along line 3—3 of FIG. 2.

A funeral procession warning apparatus according to the present invention will now be described with reference to FIGS. 1 through 5 of the accompanying drawings. A funeral procession warning apparatus 10 according to one embodiment of the present invention includes a base unit 12 having opposed top 14 and bottom 16 sides with the top side having a contour that is radially tapered toward the bottom side (FIGS. 2 and 3). The base unit 12 defines an interior cavity 18. The bottom side 16 of the base unit 12 includes a magnet 20 extending radially thereabout such that the base unit 12 may releasably adhere to a flat, metallic surface of an automobile, the flat surface preferably being the roof, hood, or trunk lid. The magnetic surface is preferably constructed of a soft, flexible magnetic material that will not scratch a vehicle surface.

The warning apparatus 10 includes a hollow pole 22 having opposed first and second ends. The first end of the pole 22 is fixedly attached to the top side 14 of the base unit 12 and the pole 22 extends upwardly therefrom. Therefore, the pole 22 extends generally vertically above an automobile surface when the magnetic bottom side of the base unit 12 is adhered thereto. A light source 24 is mounted to the second end of the pole 22 and may be encompassed by a transparent, spherical light housing 26. Preferably, the light source 24 is a strobe light that provides intermittent pulses of light at a high frequency when energized. An opaque shield member 28 having an arcuate configuration is positioned in the light housing 26 so as to block rays of light emitted by the light source 24 from inhibiting the vision of a driver of a vehicle on which the base unit 12 is mounted. The shield member 28 presents a generally hemispherical configuration so as to preclude only the rearward projection of light streaming from the light source 24.

A rechargeable battery 30 is positioned within the interior cavity 18 of the base unit 12 (FIG. 3). The battery 30 is electrically connected to the light source 24 with a wire 32. The battery 30 is also electrically connected to a switch 34, the switch being slidably movable between first (on) and second (off) configurations. At the first (on) configuration, current from the battery 30 is permitted to flow to the wire 32 and on to the light source 24. At the second (off) configuration, current is not permitted to flow to the light source 24.

A flag 36 having a generally rectangular configuration is axially coupled to the pole 22. Preferably, the flag 36 is coupled to the pole 22 with a pair of ring clips 38 that may rotate around the pole 22 such that the flag 36 rotates about the pole in the wind rather than becoming wrapped thereabout and being unreadable. The ring clips 38 may also be removable such that flags having different indicia may be substituted as desired. Preferably, the flag 36 includes indicia 40 indicative of a funeral procession, such as the word "FUNERAL". The flag 36 may include a color to further indicate a funeral procession, such as the color purple.

Figure 5:
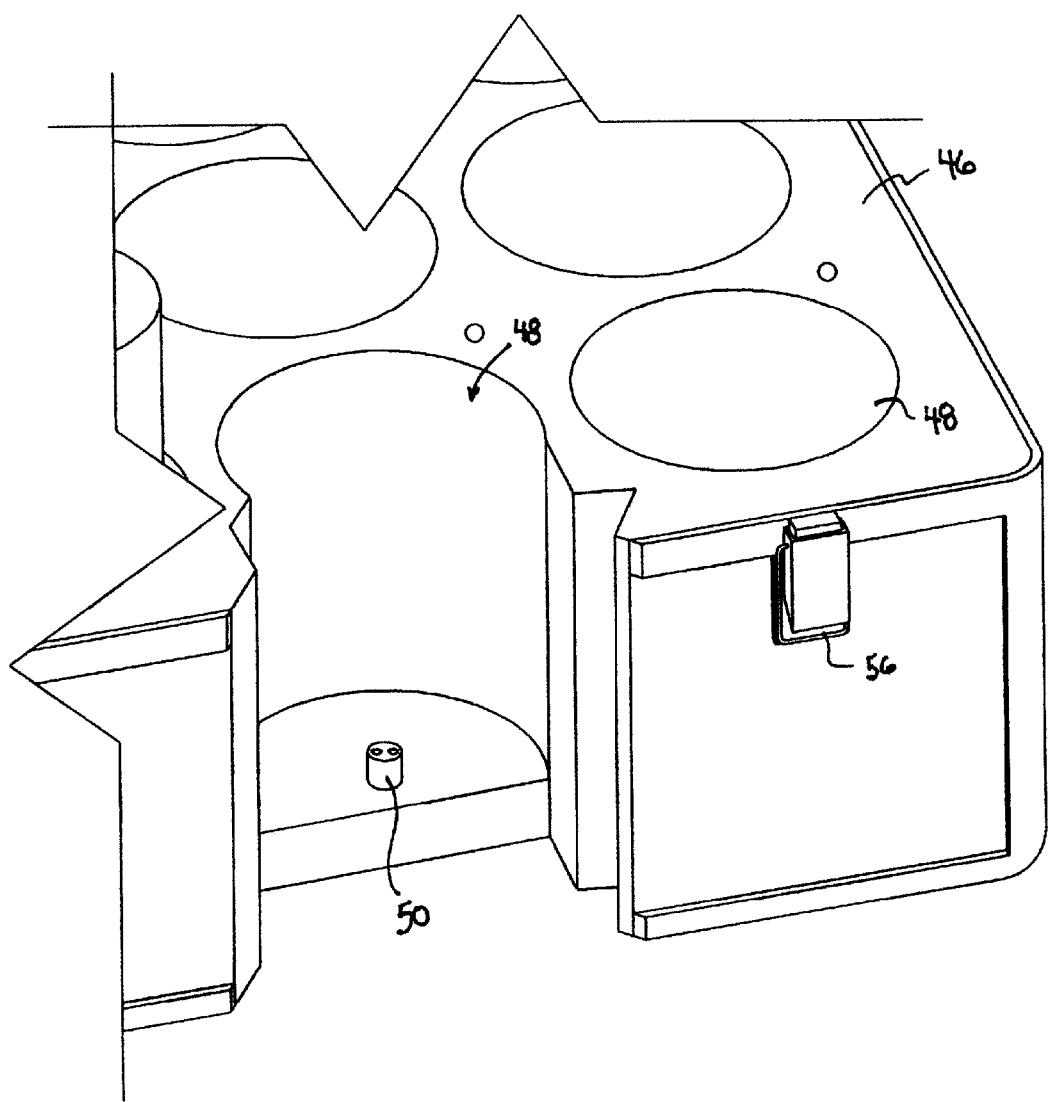
FIG. 5 is a fragmentary view of a recharging unit as in FIG. 1 with a front side cut away to show a socket therein.

The base unit 12 includes a male connector 42 electrically connected to the rechargeable battery 30 with wires 44 and extending through the bottom side 16 of the base unit 12 for recharging the battery 30 when connected to a recharging unit 46 (FIG. 3). The apparatus 10 includes a recharging unit 46 having a receptacle 48 for selectively holding the base unit 12. The receptacle 48 includes a socket 50 configured to mate with the male connector 42 when the base unit 12 is positioned in the receptacle 48 by a user (FIG. 5). The recharging unit 46 includes a conventional electrical cord 52 that may be connected to a power source such as a conventional wall outlet such that the base unit battery 30 may be recharged when the male connector 42 is connected to the socket 50.

Figure 1:
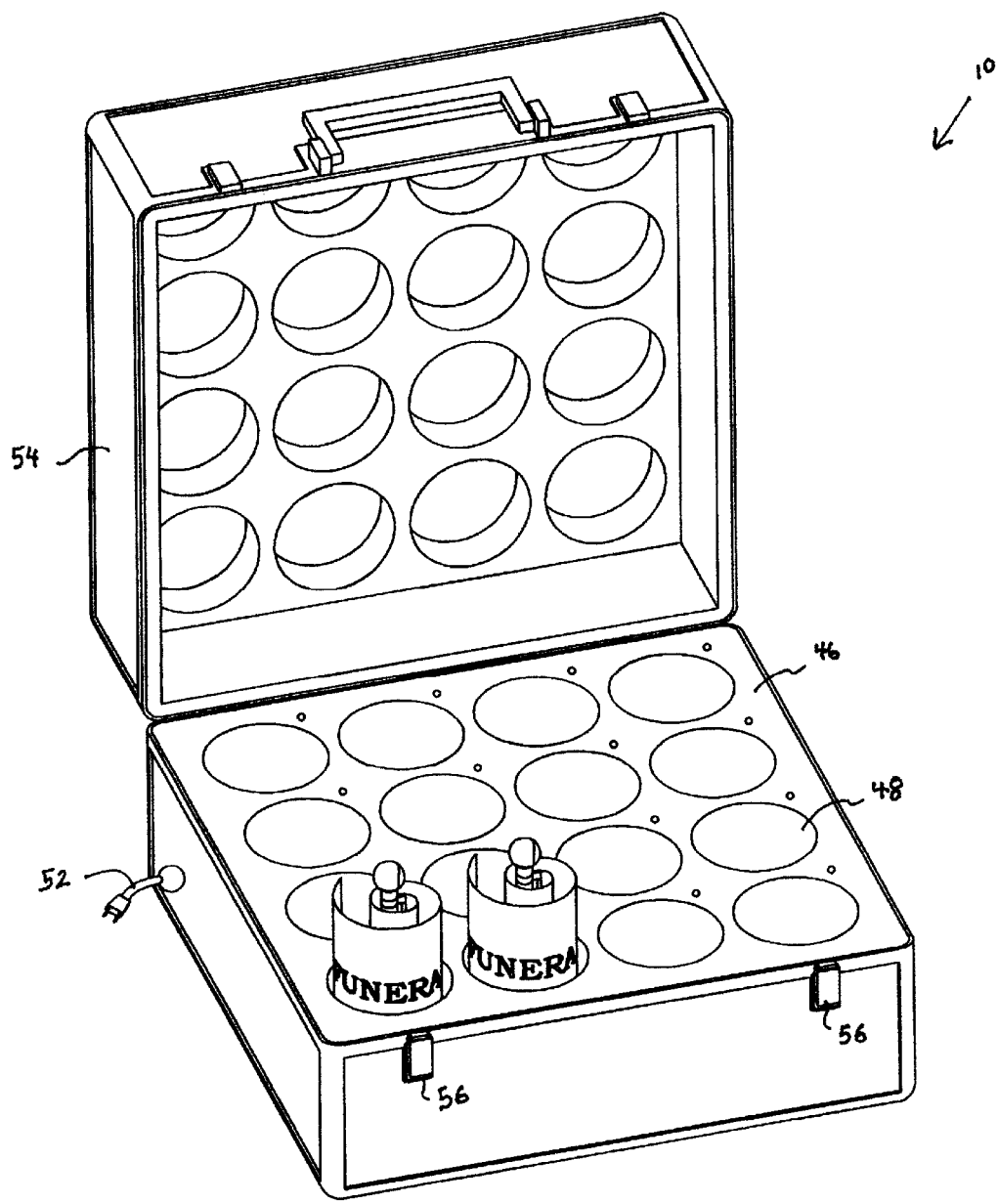
FIG. 1 is a perspective view of a funeral procession warning apparatus according to a preferred embodiment of the present invention.

As shown in FIG. 1, the recharging unit 46 is a generally square case having a plurality of receptacles 48 for holding a plurality of base units 12. The case includes a lid 54 that may be secured with latches 56 such that base units may be stored therein when not in use. Each receptacle 48 includes a socket 50 such that the batteries of the plurality of base units may be recharged at the same time in the manner described previously. Having a plurality of base units 12 is advantageous in that each vehicle, or at least several vehicles, in a funeral procession may have base units mounted thereon for alerting other motorists of the procession.

In use, a base unit 12 may be removed from the recharging unit 46 and mounted upon a flat, metallic surface of an automobile, such as the hood or roof. The base unit 12 may be magnetically, and therefore releasably, adhered to the chosen surface. The light source 24 at the upper end of the pole 22 may be activated by moving the on/off switch 34 to the first (on) position. The flag 36 includes indicia 40 indicative of a funeral procession and automatically unfurls in the wind as the vehicle begins moving. Of course, a plurality of base units 12 may be mounted to selected cars participating in the procession. When no longer needed, the base units 12 may be returned to respective receptacles 48 of the recharging unit 46 where respective male connectors 42 mate with respective sockets 50. The batteries of the base units 12 may then be recharged when the recharging unit 46 is connected to a power source.

Figure 4:
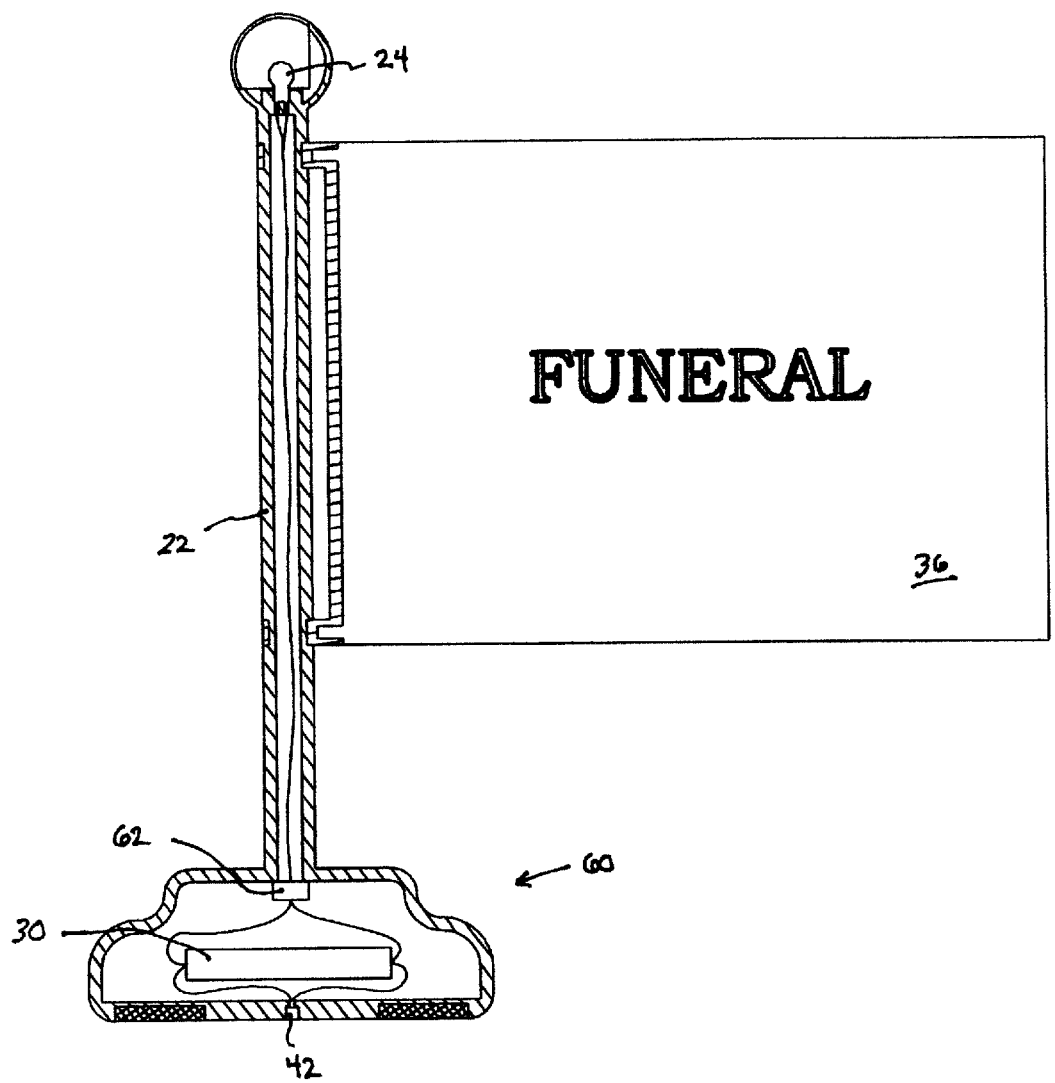
FIG. 4 is a sectional view taken along line 3—3 of FIG. 1 according to another embodiment of the invention.

Another embodiment of a base unit 60 is shown in FIG. 4 and includes a construction substantially similar to the base unit 12 described above except as specifically noted below. In this embodiment, the switch 34 has been removed as it is not needed to activate the light source 24. Instead, a receiver 62 is mounted in the cavity 18 and is electrically connected to the battery 30 intermediate the battery 30 and light source 24. The receiver 62 permits current from the battery 30 to energize the light source 24 when the receiver 62 receives a predetermined signal from a remote transmitter (not shown). Receivers 62 in the plurality of base units 60 are actuated by the same signal. Therefore, only a single transmitter is needed and may be utilized by the lead driver, funeral director, etc. to simultaneously activate or deactivate the light sources of all the base units.

It is understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. A funeral procession warning apparatus, comprising:
   a base unit having top and bottom sides and defining an interior cavity, said bottom side having a magnetic surface adapted to releasably adhere to a metallic surface of an automobile;
   a hollow pole having a first end attached to said top side of said base unit such that said pole extends generally vertically above said automobile metallic surface, said pole having a second end;
   a light source mounted at said second end;
   a rechargeable battery positioned in said interior cavity and electrically connected to said light source for delivering current to said light source;
   a male connector electrically coupled to said battery and extending through said bottom side of said base unit;
   a switch positioned on said top side of said base unit and electrically connected to said battery in a first position for selectively energizing said light source;
   a shield member at said second end of said pole having an arcuate configuration and positioned so as to block rearward projection of light rays streaming from said light source; and
   a recharging unit adapted to hold said base unit, said recharging unit including a socket for selectably mating with said male connector, said recharging unit having an electrical cord electrically connected to said socket and adapted to selectably mate with a power source for recharging said battery when said male connector is connected to said socket.

2. The warning apparatus as in claim 1 further comprising a flag coupled to said pole, said flag having indicia thereon indicative of a funeral procession.

3. The warning apparatus as in claim 1 wherein said light source is a strobe light adapted to emit light rays intermittently at a high frequency when energized.

4. The warning apparatus as in claim 1 further comprising a receiver positioned in said cavity and electrically connected to said battery and to said light source for allowing electrical current to flow from said battery to said light source upon receiving a signal from a transmitter.

5. A funeral procession warning system, comprising:
   a plurality of base units, each base unit having top and bottom sides and defining an interior cavity, said bottom side having a magnetic surface adapted to releasably adhere to a flat metallic surface of an automobile, each base unit further comprising:
   a hollow pole having a first end attached to said top side of said base unit such that said pole extends generally vertically above said automobile flat metallic surface, said pole having a second end;
   a light source at said second end of said pole;
   a rechargeable battery positioned in said interior cavity and electrically connected to said light source for delivering current to said light source;
   means for selectably energizing said light source;
   a male connector electrically coupled to said battery and extending through said bottom side of said base unit;
   a shield member at said second end of said pole, said shield member having an arcuate configuration and positioned so as to block rearward projection of light rays streaming from said light source; and
   a recharging unit having a plurality of receptacles for holding said plurality of base units, said recharging unit having a plurality of sockets positioned in respective receptacles for mating wit respective male connectors, said recharging unit having an electrical cord electrically connected to said socket and adapted to selectably mate with a power source for recharging said batteries of respective base units when respective male connectors are connected to corresponding sockets.

6. The warning system as in claim 5 wherein each base unit comprises a flag coupled to said pole, said flag having indicia thereon indicative of a funeral procession.

7. The warning system as in claim 5 wherein each light source is a strobe light adapted to emit light rays intermittently at a high frequency when energized.

8. The warning apparatus as in claim 5 wherein each base unit comprises a receiver positioned in said cavity and electrically connected to said battery and to said light source for allowing electrical current to flow from said battery to said light source upon receiving a signal from a transmitter.

9. A funeral procession warning apparatus, comprising:
   a plurality of base units, each base unit having top and bottom sides and defining an interior cavity, said bottom side having a magnetic surface adapted to releasably adhere to a flat metallic surface of an automobile, each base unit further comprising:
   a hollow pole having a first end attached to said top side of said base unit such that said pole extends generally vertically above said automobile flat metallic surface, said pole having a second end;
   a flag coupled to said pole, said flag having indicia thereon indicative of a funeral procession;
   a light source at said second end of said pole, said light source being a strobe light for emitting light rays intermittently at a high frequency when energized;
   a shield member at said second end of said pole having an arcuate configuration and being positioned so as to block rearward projection of light rays streaming from said light source;
   a receiver positioned in said cavity and electrically connected to said battery and to said light source for allowing electrical current to flow from said battery to said light source upon receiving a signal from a transmitter;
   a rechargeable battery positioned in said interior cavity and electrically connected to said light source for delivering current to said light source;
   a switch positioned on said top side of said base unit and electrically connected to said battery in a first configuration for selectively energizing said light source;
   a male connector electrically coupled to said battery and extending through said bottom side of said base unit; and
   a recharging unit having a plurality of receptacles for holding said plurality of base units, said recharging unit having a plurality of sockets positioned in respective receptacles for mating with respective male connectors, said recharging unit having an electrical cord electrically connected to said socket and adapted to selectably mate with a power source for recharging said batteries of respective base units when respective male connectors are connected to corresponding sockets.

* * * * *

UNITED STATES PATENT AND TRADEMARK OFFICE
CERTIFICATE OF CORRECTION

| | | |
|---|---|---|
| PATENT NO. | : 6,599,001 B2 | Page 1 of 4 |
| DATED | : July 29, 2003 | |
| INVENTOR(S) | : James E. Johnson | |

It is certified that error appears in the above-identified patent and that said Letters Patent is hereby corrected as shown below:

Title page,
Replace the informal drawing with the formal drawing of Fig. 3

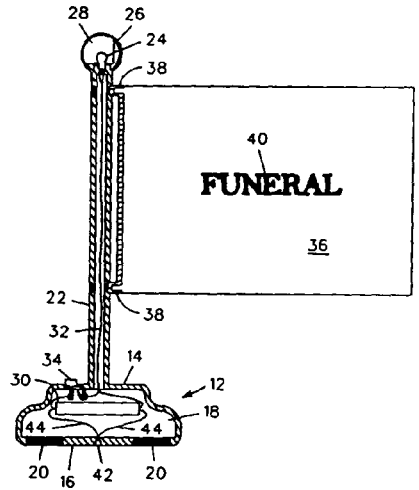

Drawings,
Sheet 1 of 5, replace the informal drawing of Fig. 1 with the formal drawing of Fig. 1.

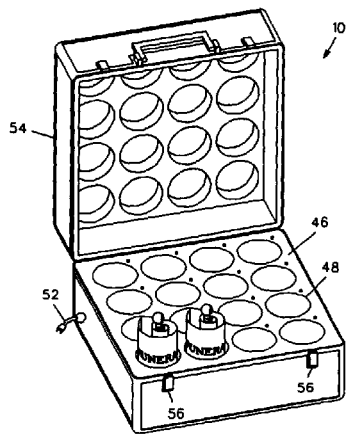

UNITED STATES PATENT AND TRADEMARK OFFICE
CERTIFICATE OF CORRECTION

PATENT NO.   : 6,599,001 B2
DATED        : July 29, 2003
INVENTOR(S)  : James E. Johnson It is certified that error appears in the above-identified patent and that said Letters Patent is hereby corrected as shown below:

Drawings (cont'd),
Sheet 2 of 5, replace the informal drawing of Fig. 2 with the formal drawing of Fig. 2.

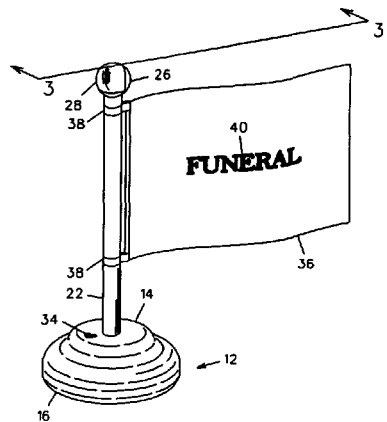

FIG. 2

Sheet 3 of 5, replace the informal drawing of Fig. 3 with the formal drawing of Fig. 3.

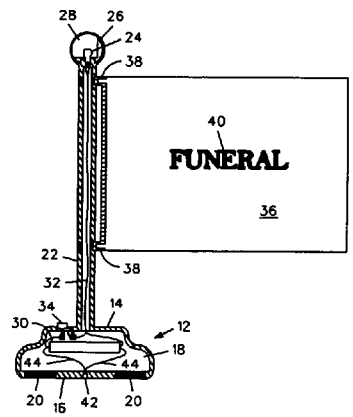

FIG. 3

UNITED STATES PATENT AND TRADEMARK OFFICE
CERTIFICATE OF CORRECTION

PATENT NO. : 6,599,001 B2
DATED : July 29, 2003
INVENTOR(S) : James E. Johnson

It is certified that error appears in the above-identified patent and that said Letters Patent is hereby corrected as shown below:

Drawings,
Sheet 4 of 5, replace the informal drawing of Fig. 4 with the formal drawing of Fig. 4.

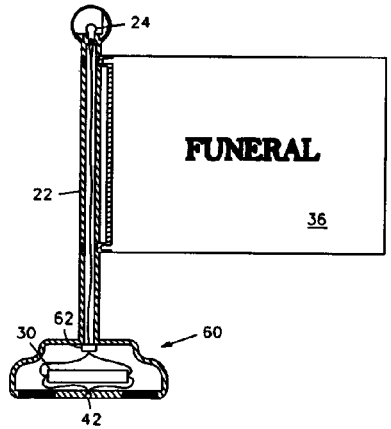

FIG. 4

UNITED STATES PATENT AND TRADEMARK OFFICE
CERTIFICATE OF CORRECTION

PATENT NO.      : 6,599,001 B2
DATED           : July 29, 2003
INVENTOR(S)     : James E. Johnson It is certified that error appears in the above-identified patent and that said Letters Patent is hereby corrected as shown below:

Drawings,
Sheet 5 of 5, replace the informal drawing of Fig. 5 with the formal drawing of Fig. 5.

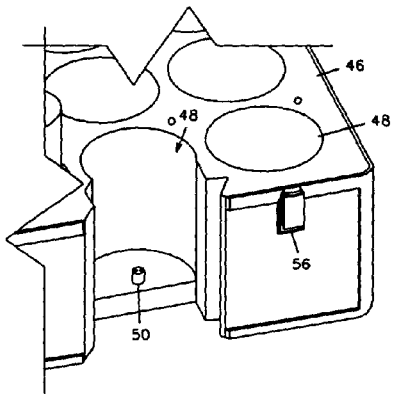

FIG. 5

Signed and Sealed this

Twenty-fourth Day of August, 2004

JON W. DUDAS
*Director of the United States Patent and Trademark Office*